Sept. 1, 1931.  B. H. PETER  1,821,029
RAILWAY SIGNALING APPARATUS
Filed Oct. 19, 1929
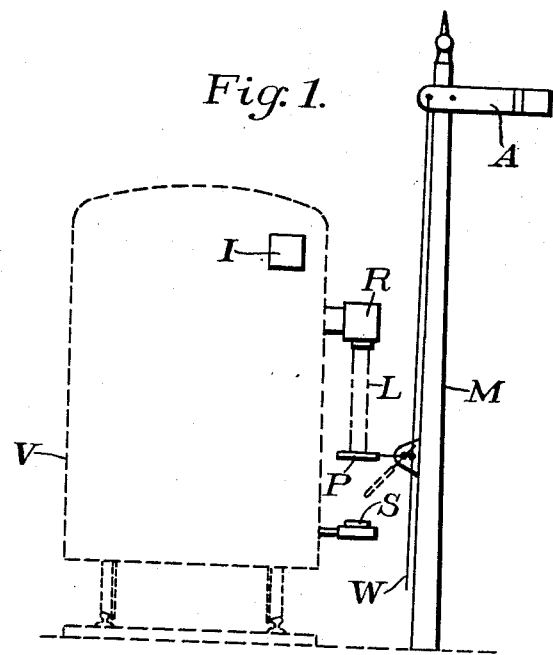
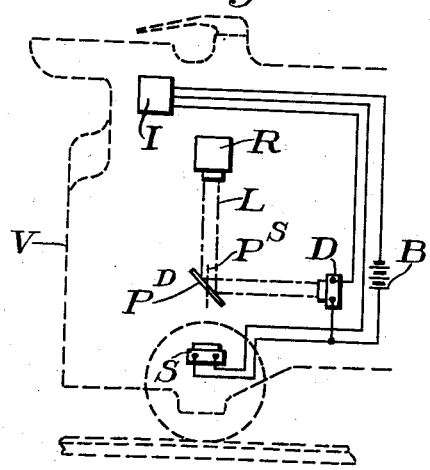
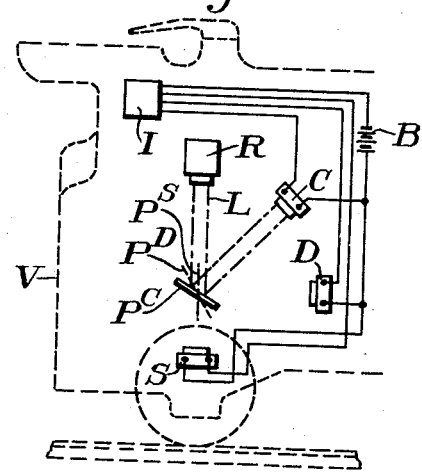
INVENTOR:
B. H. Peter,
by A. R. Vennall,
His Attorney Patented Sept. 1, 1931

1,821,029

UNITED STATES PATENT OFFICE

BERNARD HARTLEY PETER, OF LONDON, ENGLAND, ASSIGNOR, BY MESNE ASSIGNMENTS, TO THE UNION SWITCH & SIGNAL COMPANY, OF SWISSVALE, PENNSYLVANIA, A CORPORATION OF PENNSYLVANIA

RAILWAY SIGNALING APPARATUS

Application filed October 19, 1929, Serial No. 400,830, and in Great Britain November 20, 1928.

This invention relates to railway signaling apparatus and has for its object to provide improved apparatus of this character which shall be simple in construction and reliable in operation.

The invention utilizes the action of a beam of light or other form of radiation upon an element sensitive to such radiation for the control of a signal or other traffic controlling device carried upon a train or vehicle and according to the principal feature of the invention the source of radiation is carried upon the train or vehicle and the action of the radiation emitted therefrom is controlled by a device such as a screen or its equivalent located on the track at the point at which a signal indication is to be given as the train or vehicle passes this point.

The nature of the sensitive element will evidently depend upon the character of the radiation utilized and in the case of light rays may be a selenium cell interposed in an electric circuit controlling an electrically actuated indicator of any suitable type.

The invention is illustrated by way of example in the accompanying drawings Fig. 1 of which is a view in end elevation, mainly diagrammatic, showing track and train-carried signaling apparatus embodying one form of the invention.

Figures 2 and 3 are similar views in side elevation illustrating modified apparatus also embodying the invention.

Referring now first to the apparatus shown in Figure 1 it will be seen that a railway vehicle V is provided with a device R constituting a source of radiation and adapted to project a beam L of light rays for instance towards a sensitive element S also carried upon the vehicle V, the element S being in the case of light rays constituted by a selenium cell.

A signal post M carrying a signal arm A is provided adjacent to the track rails along which the vehicle V travels and the usual rod or wire W operating the signal arm A is arranged also to operate a movable screen P adapted to be interposed in or withdrawn from the path of the beam L in accordance with the setting of the signal arm A.

When the screen P is in a position corresponding to a "danger" indication of the signal arm A (as shown in Figure 1), the screen P during a passage of the train or vehicle V intercepts the beam B of light or other rays projected from the device R and prevents these rays from falling on to the sensitive element S.

When, however, the screen P is in the position shown in dotted lines in Figure 1 corresponding to a "safety" indication of the signal arm A, the screen lies out of the path of the beam L and consequently does not prevent the beam L from falling on the sensitive element S during the passage of the train or vehicle V.

Under normal or "safety" condition therefore, the beam L is continuously projected on to the sensitive element S and the electrical resistance of this element is maintained at a definite value so as to permit the passage of current of a corresponding magnitude to energize a relay or its equivalent and thereby give a "safety" indication by means of a suitable indicator I on the vehicle V. During the passage of the train or vehicle past a signal post M the screen P of which is adjusted to its "safety" position, the normal conditions above described still obtain, the beam L continuing to illuminate the sensitive element S. In the event however of the train or vehicle V passing a signal post M the screen P of which is adjusted to its "danger" position, the screen will, during the passage of the train or vehicle momentarily intercept the beam L so that the sensitive element S is temporarily unilluminated. As a result the electrical resistance of the sensitive element S will be correspondingly varied and the relay will thus be operated to cause a "danger" indication to be given on the indicator I.

It will be understood that in addition to operating the indicator I on the train or vehicle V when the latter passes a signal point at which the screen P is in its "danger" position the sensitive element S may also be arranged to effect an automatic application of the brakes in any suitable way.

In the modified apparatus shown in Figure 2, the screen is when in its "danger" position (as indicated at P^D), in addition to intercepting the beam L of rays from the source R, arranged to reflect these rays on to a second sensitive element D thereby giving what may be termed a "positive" indication during the passage of a train or vehicle.

When however the screen is in its "safety" position as indicated in dotted lines at P^s, the beam L falls on the sensitive element S, so that a corresponding indication continues to be given at the indicator I.

The sensitive elements S, D are in this case shown as electrically connected to the indicator I by circuits energized from a battery B.

In the further modification shown in Figure 3 the screen is arranged to occupy one or other of three different positions in each of which it operates to direct the beam L of radiation on to a different sensitive element, thus enabling positive indications of a corresponding number of different signal aspects to be given on the train or vehicle.

When the signal operating the screen is in its "safety" position, the screen occupies the position shown in dotted lines at P^s so that under these conditions the beam L falling on to the sensitive element S is not affected as the train or vehicle passes the signal, and a "safety" indication continues to be given at the indicator I.

If however the signal is in its "caution" position the screen occupies the position shown in full lines at P^C, so that the beam of rays L is reflected on to the sensitive device C and a corresponding indication is given at the indicator I, as the train passes the signal.

When the signal is in its "danger" position, the screen occupies the position shown in dotted lines at P^D and the beam of rays L is reflected on to the sensitive device D, thus causing a danger indication at the indicator I as the train passes the signal.

It will be understood that the screeen above referred to may in certain cases be replaced by a refracting device or by any other arrangement adapted to control or influence the action of the radiant beam as the latter passes the signal point.

In these and other respects the invention is not limited to the particular constructional arrangements described and illustrated which may obviously be varied as desired in order to meet the required condition.

Having now particularly described and ascertained the nature of my said invention and in what manner the same is to be performed I declare that what I claim is:

1. Railway signaling apparatus comprising two vehicle carried elements sensitive to radiation, a source of radiation on the vehicle normally acting on one of said elements, trackway means effective under certain traffic conditions to intercept the radiation from said source and to direct it upon the other of said elements, and indicating means controlled by said elements.

2. Railway signaling apparatus comprising a vehicle-carried element sensitive to radiation, a source of radiation on the vehicle normally acting on said element, a trackway screen controlled by traffic conditions in advance and acting at times to intercept the radiation from said source and thereby preventing it from acting on said element, and indicating means controlled by said element.

3. Railway signaling apparatus comprising a vehicle-carried element sensitive to radiation, a source of radiation on the vehicle normally acting on said element, a screen located in the trackway and movable into and out of position wherein it intercepts the radiation from said source and so prevents such radiation from acting on said element, and indicating means controlled by said element.

In testimony whereof I affix my signature.

BERNARD HARTLEY PETER.